Oct. 29, 1963 D. KAHN 3,108,444

MAGNETO-CALORIC CRYOGENIC REFRIGERATOR

Filed July 19, 1962 2 Sheets-Sheet 1

INVENTOR.
DAVID KAHN

BY

Sughrue, Rothwell, Mion & Zinn
ATTORNEYS

MAGNETO-CALORIC CRYOGENIC REFRIGERATOR

Filed July 19, 1962 2 Sheets-Sheet 2

INVENTOR.
DAVID KAHN

BY

Sughrue, Rothwell, Mion & Zinn
ATTORNEYS

United States Patent Office 3,108,444
Patented Oct. 29, 1963

3,108,444
MAGNETO-CALORIC CRYOGENIC REFRIGERATOR

David Kahn, Baltimore, Md., assignor to Martin-Marietta Corporation, Baltimore, Md., a corporation of Maryland Filed July 19, 1962, Ser. No. 210,917
18 Claims. (Cl. 62—3)

This invention relates to a refrigerator apparatus capable of producing extremely low temperatures in the order of 4° Kelvin and more particularly to an improved refrigerating apparatus of the magneto-caloric cryogenic type based on the phenomena of superconductivity of certain materials at temperatures up to 18° Kelvin.

The property of certain materials described as "superconducting" is based on the fact that at temperatures below a certain "transition temperature" ($T_c$) materials of this class can exist in two states, one called "normal" and one called "superconducting." All metal elements and metallic and semi-metallic compounds which are not "superconducting" are in a "normal" state at all temperatures and have the usual metallic properties of behavior. Those materials which can exist in a superconducting state pass into this state when they are cooled below the transition temperature if they are not at this time subjected to too large a magnetic field. The "superconducting" state is characterized by the vanishing of the macroscopic electric field "E" inside the material and the vanishing of the macroscopic magnetic induction "B" inside the material. A material which is passed into the superconducting state will remain in that state unless its temperature is raised above the transition temperature or it is placed in a magnetic field of a strength of approximately a few hundred or few thousand Gauss for most materials. The magnetic field strength necessary to cause the transition from the "superconducting" to the "normal" state increases with decreasing temperature from zero at the transition temperature $T_c$ to a maximum value at absolute zero (0° Kelvin or a −273.16° C.).

Several unique characteristics are present when a material is in a superconductive state. For instance, its resistance is equal to zero. This particular characteristic is quite advantageous for use in electrical circuits in which a current may circulate theoretically for an infinite period of time, since there is no electrical resistance to such flow. Another characteristic which increases the usefulness of a material exhibiting the property of superconductivity is a variation in the ability of the conductor to pass a heat current easily or act as a thermal insulator depending upon whether the conductor is in the normal or superconductive states, respectively.

The present invention is based on a related characteristic; that is, if the material is in the "superconducting" state and is thermally isolated from its surroundings and subjected to a magnetic field of sufficient intensity to cause it to pass into the "normal" state, its temperature will drop. Conversely, if the material is capable of being superconducting and is at a temperature below the zero magnetic field transition temperature and positioned in a magnetic field strong enough to cause the material to be in its normal state, it will, if thermally isolated, rise in temperature if the magnetic field is removed with the material passing into the superconducting state.

It is, therefore, the principal object of this invention to provide an improved magneto-caloric cryogenic refrigerator based on the theory that a material capable of being in a superconductive state in the absence of a magnetic field, will, if thermally isolated, as a result of changing from normal to the superconductive state, experience a temperature rise and conversely such a material, and as a result of being subjected to a magnetic field of critical field intensity, will change from the superconductive state to the normal state with a resultant decrease in temperature.

It is a further object of this invention to provide an improved refrigerating apparatus of this type which may be simply and easily manufactured involving a minimum number of parts.

It is a further object of this invention to provide an improved refrigerating apparatus of this type for producing extremely low temperatures in a highly efficient manner.

It is a further object of this invention to provide an improved refrigeration apparatus of this type which advantageously allows the cascading of a number of individually operable units to achieve extremely low temperatures by simple thermal coupling means.

Further objects of this invention will be pointed out in the following detailed description and claims and illustrated in the accompanying drawings which disclose, by way of example, the principle of this invention and the best modes which have been contemplated of applying that principle.

Briefly, the apparatus of the present invention comprises a magnetic-caloric cryogenic refrigerator including a pair of spaced heat reservoirs thermally coupled by a material having superconducting properties. Means are provided for subjecting the material to a temperature sufficiently low to cause superconductivity therein and means are also provided for subjecting a portion of the material to a magnetic field of critical field intensity acting to cause this portion of the material to revert to its normal state with a subsequent decrease in temperature. Means are further provided for effecting progressive relative movement between the material and the magnetic field to cause a net heat transfer from one of said reservoirs to the other.

In one specific form, a rotating wheel, including a rim of superconductive material, is positioned with the rim in thermal contact with the reservoirs and a portion of the rim, while in contact with one of the heat reservoirs, is subjected to a magnetic field of critical field intensity. In another embodiment, a longitudinally extending rod of superconductive material acts to thermally couple a pair of spaced heat reservoirs with an electrical coil being positioned on the rod and including a plurality of taps which may be selectively and progressively energized from one reservoir to the other to effect a net heat transfer in the direction of movement of the magnetic field. A third embodiment makes use of an axially moving permanent magnet or a superconductive solenoid carrying a current capable of providing a magnetic field of critical field intensity, the longitudinal rod of superconductive material being positioned in the path of the magnetic field. Means are provided for moving the permanent magnet or solenoid longitudinally along the axis of the rod to effect a heat transfer from one reservoir to the other in the direction of movement of the permanent magnet.

Figures 1, 2, 3:
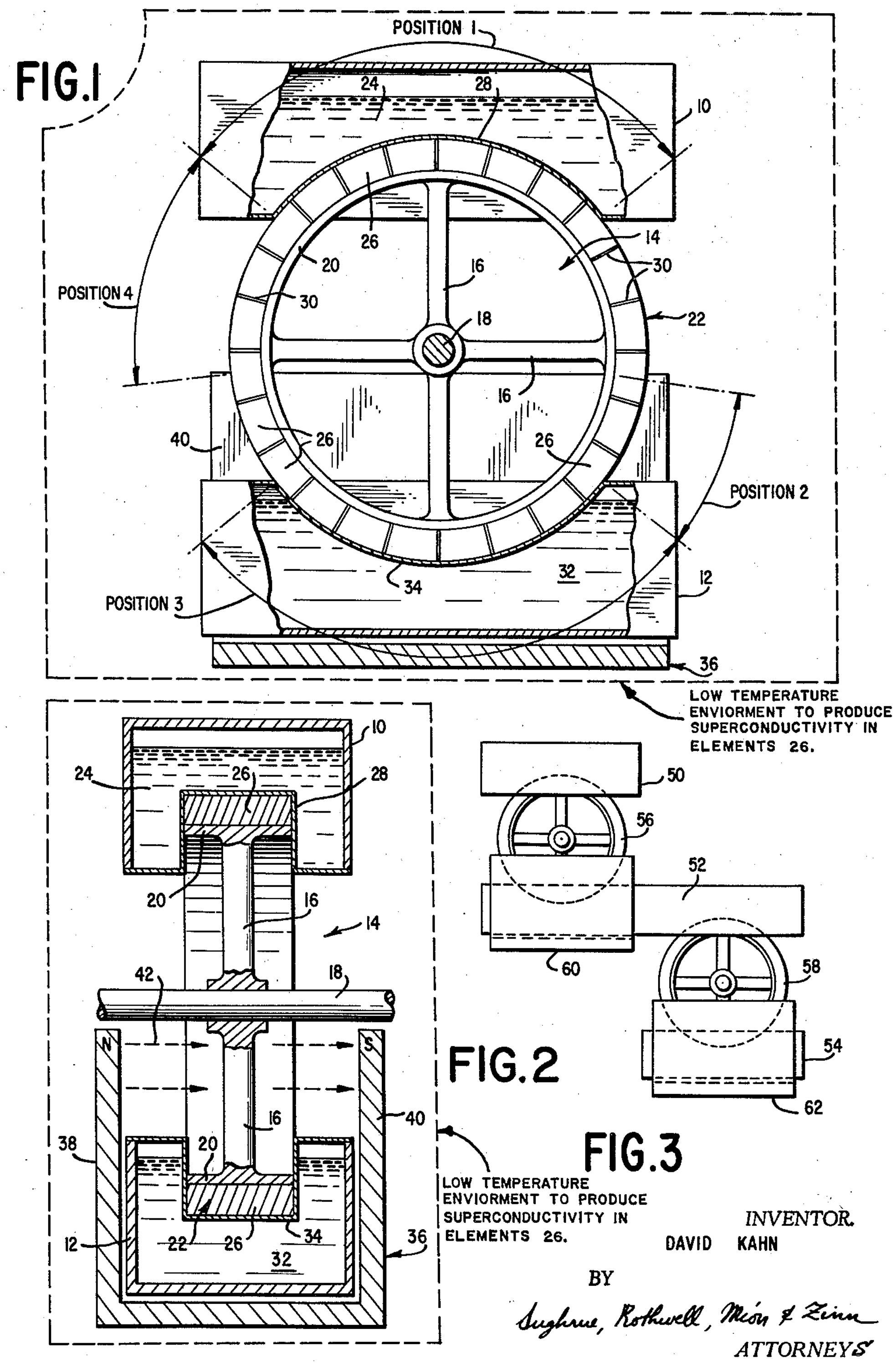
FIG. 1 is a side elevational view, partially in section, of a refrigerating apparatus embodying one form of this invention.
FIG. 2 is a front elevational view, partially in section, of the apparatus shown in FIG. 1.
FIG. 3 is a side elevational view of a cascade arrangement of a pair of units of the type shown in FIG. 1, which are thermally coupled in serial fashion to obtain extremely low temperatures.

Referring now to FIGS. 1 and 2 of the drawings, there is shown in one form, a refrigeration apparatus making use of the principles discussed above. The apparatus includes a pair of heat reservoirs 10 and 12, respectively, the heat reservoir 10 being at a temperature $T_1$ which may be produced by conventional means such as by a quantity of liquid hydrogen at atmospheric pressure or solid nitrogen at low pressure. The heat reservoirs 10 and 12 may take the form shown and may be constructed of any suitable material. Positioned intermediate of the reservoirs 10 and 12 is a wheel 14 including a number of radially extending spokes 16 acting to join a central pivot point 18 to an inner rim member 20. Means (not shown) are provided for rotating the wheel 14 about its axis 18. The materials forming the spokes and inner rim may be of any suitable material with a low thermal conductivity. However, the outer rim 22 is constructed of a material having superconducting properties and whose superconducting transition temperature is above that of the heat reservoir 10 at temperature $T_1$. By reducing the pressure above the liquid hydrogen 24 within the heat reservoir 10 through the use of a vacuum, the temperature of the reservoir may be easily lowered to several degrees below the boiling point of hydrogen under standard atmospheric pressure, 20.4° Kelvin. A material which has been found quite suitable for the rim 22 is $Nb_3Sn$ having a transition temperature in the absence of a magnetic field of 18° Kelvin. As the wheel revolves about its axis 18, all of the individual elements 26 making up the segmental rim 22 are brought to the temperature $T_1$ by being placed in thermal contact with the bath 24 at $T_1$. The temperature $T_1$ may also represent the temperature for which the elements 26 become superconductive. As indicated in FIGS. 1 and 2, during operation it is necessary that the apparatus, or at least that portion containing the superconductive material such as elements 26, be positioned in a low temperature environment to produce and maintain the elements in the superconductive state, with the exception of those elements being momentarily subjected to the magnetic field indicated by arrows 42. This requirement of providing a low temperature environment to produce superconductivity in the thermal transfer material applies equally to the other embodiments of this invention. This contact can be advantageously made through the use of a thin metal membrane 28 which forms a curved bottom surface to the heat reservoir 10 and acts to eliminate any possible leakage of the liquid hydrogen at this point. The individual elements 26 forming the superconductive rim 22 may be separated by thermal insulators 30 or by cutting a radial groove in the rim to prevent heat leakage along the rim of the wheel in a peripheral direction.

It is apparent, therefore, that as the wheel 14 revolves the individual segments 26, which initially contact membrane 28 in thermal contact with the liquid hydrogen 26, move to a position where they will be in thermal contact with the liquid helium bath 32. A second membrane 34 prevents direct physical contact between the segments 26 of the rotating wheel and the liquid hydrogen bath 32 within heat reservoir 12.

At the present time, temperatures in the region of the boiling point of helium are produced only by using a bath of liquid helium with a heat of vaporization of 5.19 calories per gram as a temperature bath and heat sink. The heat transferred to the helium bath results in an evaporation of the bath which is replenished periodically.

The method of the present invention allows the removal of heat from objects at temperatures in the liquid helium region and deliverance of this heat to a bath of liquid hydrogen which has a heat of vaporization of 106.8 calories per gram, which is much larger than that for liquid helium. Thus, the amount of liquid hydrogen needed to extract a given amount of heat from a reservoir at the temperature of liquid helium or above is less than the weight of liquid helium needed. Also, hydrogen is more easily liquified than helium. The advantage of using liquid hydrogen as the heat sink instead of liquid helium is reduced when the temperature of the cold reservoir becomes too low since, as an amount of heat $Q_c$ is extracted from a cold reservoir at temperature $T_c$°, the minimum amount of heat that must be given up to the hot reservoir at temperature $T_h$ is $$Q_c x\left(\frac{T_h}{T_c}\right)$$

Since the temperature $T_1$ of the liquid hydrogen bath 24 in the upper heat reservoir 10 is at a temperature less than the superconducting transition temperature of the $Nb_3Sn$ material forming the outer rim of the rotating wheel, it is apparent that there will be a transition of this material from the normal state to the superconducting state at the point where the individual elements 26 are in thermal contact with diaphragm 28. The present invention is based on the theory that the materials at a temperature below the superconducting transition temperature, if thermally isolated, will undergo a temperature decrease in response to subjection to a magnetic field of critical field intensity and vice versa. The apparatus shown in FIGS. 1 and 2 includes a magnet capable of providing a field of critical field intensity. Schematically, a U-shaped permanent magnet 36 including spaced north and south poles 38 and 40, respectively, is used. As a result, the individual segments 26 are subjected to a permanent magnet field 42, indicated by arrows, as the segments move away from contact with diaphragm 28 and into the path of the magnetic field 42. The magnet 36 is so shaped that the field rises gradually to lower eddy-current heating within the rotating segments 26 which would normally have a detrimental effect on the efficiency of the system. The permanent magnet field 42 is large enough to destroy the superconducting state of the rim material segments 26. Since the wheel rim, at the point where it first encounters the magnetic field 42, is not in contact with any heat reservoir, the magnetic field causes the wheel elements to pass into the normal state in essentially an adiabatic process with a drop in temperature to a temperature $T_3$. This temperature $T_3$ is less than the temperature $T_1$ or $T_2$, respectively, of either reservoir 10 or 12. As the segments 26 of the rim 22 come into contact with the second heat reservoir 12, which is at temperature $T_2$, a flow of heat occurs through the thin metallic membrane 34 whereby heat is extracted from the working fluid 32 (helium) of reservoir 12 raising the temperature of the individual segments 26 of rim 22 to the same temperature $T_2$ of the liquid helium bath 32 and at the same time cooling the reservoir 12. Progressively, the elements 26 of the rim then move away from contact with the cold reservoir to a position where they are out of the path of the magnetic field 42. Since the individual elements are no longer subjected to the magnetic field, they again pass into the superconductive state at a temperature $T_4$ which is higher than the temperature of either the hot reservoir 10 or the cold reservoir 12. Since the individual elements 26 have received heat when in contact with the liquid helium bath 32, the temperature $T_4$ is necessarily higher than the temperature $T_1$; that is, the temperature of the hot reservoir 10.

In completing the cycle, the individual segments 26 again move into contact with the membrane 28 and being at a higher temperature $T_4$ than the temperature $T_1$ of the liquid hydrogen bath 24, they give off excess heat to the high temperature reservoir 10.

As each element 26 of the rim 22 completes the same cycle, heat is extracted from the cold reservoir 12 and given off to the hot reservoir 10, thus producing the refrigerating effect. Basically, the process involves the necessity of subjecting the superconductive material to a temperature sufficiently low to produce superconductivity therein throughout the cyclic path and to move the material which is thermally isolated in a sequential manner through four separate positions which are indicated in FIG. 1. The first position is the position in which the now superconducting elements 26 are in thermal contact with the liquid hydrogen bath 24 within the high temperature reservoir 10. The second position is where the individual segments 26 move into the path of the magnetic field 42 such that a material is changed from its superconductive state to its normal state. The third position is indicated as that in which the individual segments 26 contact the membrane 34 and are in thermal contact with the liquid helium bath 32 of the low temperature reservoir 12 to allow heat transfer from the low temperature bath to the individual segments which are in their normal state. The fourth position is the position in which the individual segments after receiving heat from the low temperature reservoir 12 move out of the path of the magnetic field 42 and are returned to the superconductive state with an increase in temperature. Since it is very difficult to completely thermally isolate the apparatus and especially the low temperature reservoir 12 from the ambient, this leaking of the heat into the cold reservoir from its surroundings may be overcome by varying the rotational velocity of the wheel 14, thus acting to lower the temperature of the low temperature reservoir 12. By comparing the signal from a temperature-sensing device (not shown), attached to the low temperature reservoir 12 with a preset signal, an error signal may be obtained and used to regulate the speed of rotation of the wheel 14. By this method, the low temperature reservoir 12 may be kept at a constant temperature independent of the varying heat leakage into the reservoir from the ambient or the portions of the apparatus which are at a higher temperature than that of the low temperature reservoir 12.

Since there is a definite limitation based on the number of degrees of temperature change during the transition of the material from the superconductive to the normal state, temperatures lower than that which can be reached through one transition from the superconductive to the normal state may be obtained by cascading the refrigerating mechanism in a simple, thermal series method as shown schematically in FIG. 3. While only two wheels and three temperature reservoirs are shown in the apparatus o FIG. 3, it can be readily seen that additional stages may be included merely by adding to the basic unit. In the system shown, there is provided a first heat reservoir 50, a second heat reservoir 52, and a third heat reservoir 54. The reservoirs are spaced and are thermally connected by individual rotating wheels 56 and 58, the wheel 56 being in thermal contact with reservoirs 50 and 52, and the wheel 58 being in contact with the reservoirs 52 and 54. Suitable means for obtaining a magnetic field in the areas of the respective low temperature reservoir are indicated at 60 and 62. Note that with respect to low temperature reservoir 52, since it is acting as a low temperature reservoir at the point where it contacts wheel 56 and as a high temperature reservoir in the position where it contacts wheel 58, the magnetic field surrounds only a portion of reservoir 52 at one end only. The general operation of the composite unit shown in FIG. 3 is exactly the same as the operation of the single unit shown in FIG. 1.

It is important to note that the practical application of the fact that a temperature change occurs during the adiabatic transition of the material from a superconductive to a normal state is based on the necessity of relative movement between the material and the magnetic field. In the preferred embodiments of FIGS. 1–3, this movement occurs as a result of providing the superconductive material as a portion of a rim on a rotating wheel. That the configuration takes the form of a wheel and that the elements move in a circular path, is not critical. For instance, the individual elements 26 may be positioned on an endless belt and moved in a path which is ovoidal in form rather than circular. It is important only that the individual segments or portions of the superconductive material move in a progressive manner between the cold and the hot reservoir in an endless manner to effect a practical cycle of operation. It is apparent, therefore, that by this method, the boiling point of helium at atmospheric pressure can be reached and helium gas can be liquified without resorting to the more usual methods such as the Joule-Thompson expansion system or the Simon expansion system which require the gas to be pressurized to some extent.

The basic principles made use of in the apparatus shown in FIGS. 1–3 may be applied in a slightly different way to produce a like refrigerating effect involving a transfer of heat from a low temperature reservoir to another reservoir at a higher temperature in which the need for moving elements such that a rotating carrier or wheel 14 of the FIG. 1 apparatus, is completely eliminated.

Figure 4:
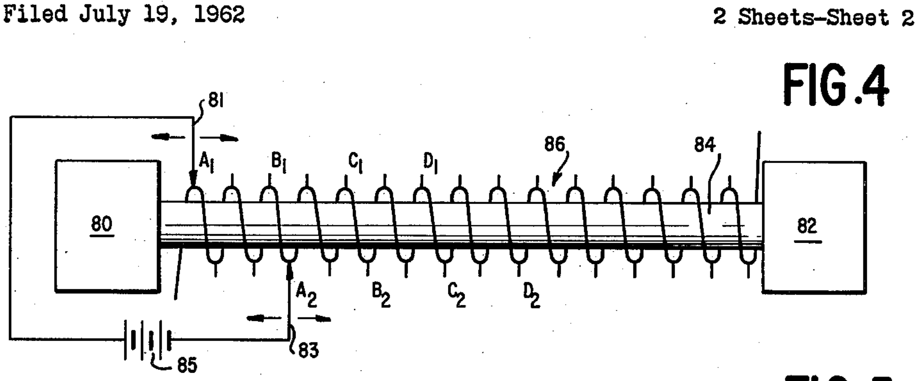
FIG. 4 is a side elevational view of a second embodiment of the present invention.

A practical apparatus may take the form of that shown in FIG. 4. In this form, a pair of spaced heat reservoirs 80 and 82 are thermally coupled by a longitudinally extending column or rod 84 formed of a material having superconducting properties. An electrical coil 86 is helically wound around rod 84 and extends the length thereof, although the operation could theoretically be performed by a coil extending only partially along the length of the rod. The coil 86 may be made of a superconducting wire if it has a higher transition temperature than that of the rod. The coil 86 includes a number of spaced tap points indicated at $A_1$—$A_2$, $B_1$—$B_2$, $C_1$—$C_2$, and $D_1$—$D_2$. In the particular form shown, electrically and mechanically speaking the tap point $B_1$ occurs before tap point $A_2$, and the tap point $C_1$ occurs before the tap point $B_2$, etc.

In operation, the apparatus is subjected to a temperature such that the rod 84 is in the superconductive state, and both reservoirs 80 and 82 are at a temperature $T_1$. Assuming no current is flowing in the helical coil 86, there will be no heat flow in either direction to or from heat reservoir 80. A direct current is caused to flow through a portion of the coil 86, such as by energizing tap points $A_1$—$A_2$ through movable leads 81 and 83 coupled to battery 85. If the value of this current is sufficient to provide a magnetic field of critical field intensity, the portion of rod 84, which is in this region, will pass into the normal state with an initial drop in temperature to a temperature $T_3$.

Figure 5:
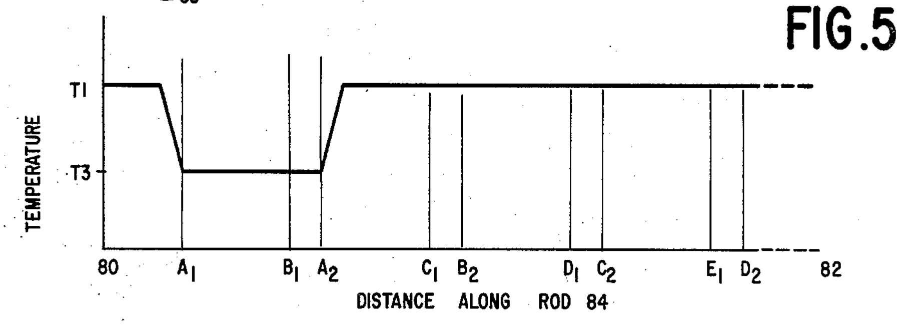
FIG. 5 is a graph showing the temperature at spaced points along the superconductive rod positioned between the heat reservoirs of the apparatus of FIG. 4 at the time the coil between tap points $A_1$—$B_1$ is energized.
Figure 6:
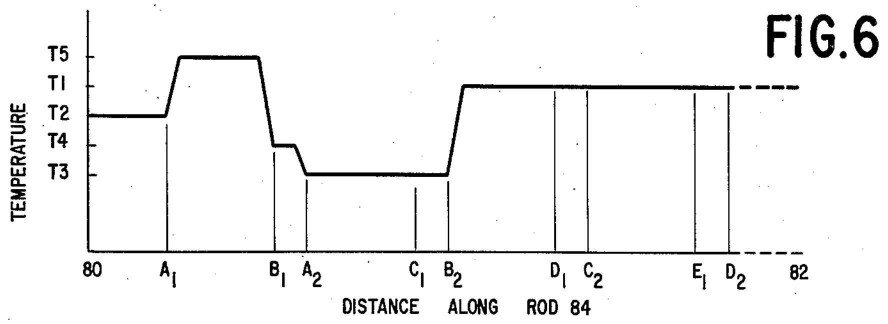
FIG. 6 is a graph showing the temperature at spaced points along the superconductive rod in like manner to the graph of FIG. 5 at the time taps $A_2$—$B_2$ are energized immediately after de-energization of the taps $A_1$—$B_1$.

Referring to FIG. 5, there is shown a plot of the temperature along the length of the rod 84 with the ordinate axis indicating the temperatures and the abscissa, the distance along the rod 84. The temperature is, at this instant, in general $T_1$ at reservoir 80, reservoir 82 and at all points along the rod with the exception of that localized area falling within the physical confines of coil tap portion $A_1$—$A_2$. This portion of the rod is at temperature $T_3$, which is below $T_1$. The exact shape of the temperature versus distance curve near the position of the tap points $A_1$ and $A_2$ depends upon the pitch of the helical coil 86 as well as other factors, but for the purpose of description of the basic cooling technique occurring with the system shown in FIG. 4, is as indicated in FIGS. 5 and 6. In any case, since the localized portion between tap points $A_1$ and $A_2$ is lower than at other points along the rod 84, heat will begin to flow into the colder region between the tap positions $A_1$ and $A_2$, as indicated in FIG. 5, thus heat will pass from the cold reservoir 80 to the left of position $A_1$ which is therefore cooled to a temperature $T_2$, as indicated in FIG. 6. Heat will also flow from the portion of the rod immediately to the right of tap point $A_2$ which will act to raise the temperature of the portion between points $A_1$ and $A_2$ to a temperature $T_4$, which is indicated in FIG. 6, as above that of temperature $T_3$, but below the original temperature $T_1$.

After a short time, and before the heat flow setup has come to equilibrium, the current through tap points $A_1$—$A_2$ is switched off and an equal current is set up in a like manner through the tap points $B_1$ and $B_2$. That portion of the rod between tap positions $A_1$ and $B_1$ will now revert from the normal state to the superconductive state at a temperature $T_5$, which is higher than $T_1$ since its temperature in the normal state had been raised from $T_3$ to $T_4$ as a result of heat flow from the portions of the rod at temperature $T_1$ after the portions of the rod between tap points $A_1$ and $A_2$ had reached temperature $T_3$ as a result of change from the superconductive to the normal state. The portion of the rod 84 between tap positions $B_1$ and $B_2$ is now in the normal state rather than the superconductive state since energization of the tap point creates a magnetic field sufficient to cause transition. As a result of the transition, the temperature at this point is lowered to temperature $T_3$ as indicated in the graph of FIG. 6. The portion of the rod 84 between tap points $A_1$ and $B_1$ will lose heat in both directions since its temperature $T_5$ is above any existing temperature along the rod and certainly above temperature $T_2$, which is the temperature of the low temperature reservoir 80 and a small portion of the rod immediately annexed thereto, and the temperature $T_4$ existing between tap points $B_1$ and $A_2$. However, since the portion of the rod between tap points $B_1$ and $A_2$ has a lower temperature $T_4$ than that portion to the left of tap point $A_1$, which is at temperature $T_2$, there will be a net flow of heat from left to right or away from the low temperature reservoir 80.

This process is repeated by successfully energizing portions of the helical coil 86 between tap points $C_1$—$C_2$, $D_1$—$D_2$, etc., until heat is finally transferred from the low temperature reservoir 80 to the high temperature reservoir 82. If current is reapplied to the portion between tap points $A_1$—$A_2$, $B_1$—$B_2$, etc., the process will be repeated and the cold or low temperature reservoir 80 will lose more heat to the rod. A portion of this heat will eventually be transferred to the high temperature or hot reservoir 82, and the refrigeration process will continue until the cold reservoir is at a sufficiently low temperature that the steady leakage of heat from the hot reservoir 82 down the rod to the left is equal to the heat being transported to the right by successive applications of current through the helical coil 86.

Since each segment of the rod is arranged in cascade with the segments to the left and right of it, the final temperature of the cold reservoir 80 can be quite low depending upon the heat loss into the cold reservoir, the material comprising the rod, the number of magnetic field pulses per unit time, etc. The strength of the magnetic field can be varied in each section to take into account the change in the minimum magnetic field necessary to produce a normal state in a superconductive material as the temperature is lowered. Also, the materials forming the rod 84 may be varied, the only requirement being that materials having superconducting properties be used.

Figure 7:
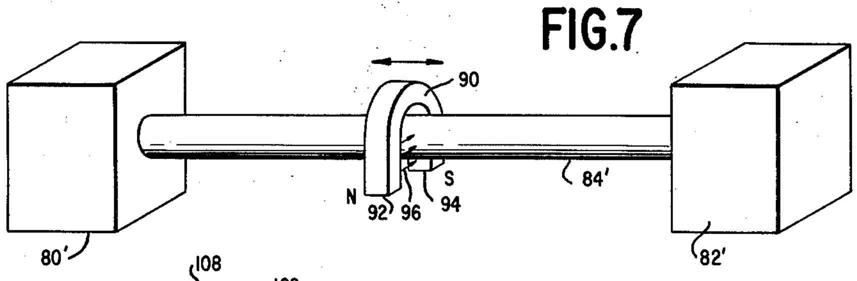
FIG. 7 is a vertical perspective view of another embodiment of the present invention.

It is not necessary to use an electromagnetic field such as that produced by helical coil 86 involving the necessity of employing a plurality of separately and progressively energized tap points to achieve relative motion between the magnetic field and the rod 84 formed of superconductive material. For instance, as indicated in FIG. 7, the helical coil 86 is eliminated. This embodiment makes use of a like apparatus employing a pair of spaced high temperature and low temperature reservoirs indicated at 80′ and 82′, respectively, which are thermally coupled by a longitudinally extending rod 84′ formed of suitable material having superconducting properties. A permanent magnet 90 or a superconducting solenoid may be employed. The permanent magnet, which may be of conventional U-shape, is positioned on rod 84′ and means (not shown) are provided for moving the permanent magnet 90 longitudinally along the axis of rod 84′. The legs include permanent magnet poles 92 and 94 having opposite polarity such that rod 84′ is subjected to a magnetic field 96, indicated by arrows, which is of critical field intensity and acts to change the state of the material forming rod 84′ at a localized area only from "superducting" to "normal." It is apparent, therefore, that as the permanent magnet is moved longitudinally along the rod from the cold reservoir 80′ to the hot reservoir 82′, an action similar to that described with respect to the apparatus shown in FIG. 4 occurs with a resultant net heat transfer from the cold reservoir 80′ to the hot reservoir 82′.

Figure 8:
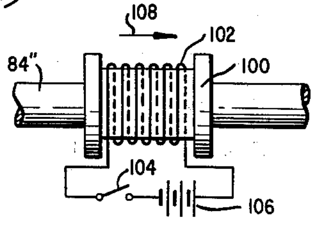
FIG. 8 is a vertical view of a portion of another embodiment of the present invention.

Referring to FIG. 8, there is shown a portion of the alternative embodiment in which rod 84″ has positioned thereon a solenoid core 100 holding helical coil 102 which may be formed of superconductive wire. Switch 104 connects battery 106 to coil 102. Means (not shown) are provided for moving the core and coil longitudinally of rod 84″ in the manner shown by arrow 108 to effect like operation to the apparatus shown in FIG. 7.

While there have been shown and described and pointed out the fundamental novel features of the invention as applied to preferred embodiments, it will be understood that various omissions and substitutions and changes in the form and detail of the device illustrated and in its operation may be made by those skilled in the art without departing from the spirit of the invention. It is the intention, therefore, to be limited only as indicated by the scope of the following claims.

What is claimed is:

1. A magneto-caloric cryogenic refrigerator comprising: a pair of spaced, thermally isolated heat reservoirs, a material having superconducting properties thermally connecting said reservoirs with said material being the sole thermal connecting means between said reservoirs, means for subjecting said material to a temperature sufficiently low to cause superconductivity therein, means for subjecting only a portion of said material to a magnetic field of critical field intensity to cause said subjected portion, while thermally isolated, to revert to its normal state with a subsequent decrease in temperature and means for effecting progressive relative movement between said material and said magnetic field to cause a net heat transfer from one reservoir to the other.

2. Apparatus as claimed in claim 1 wherein one of said spaced heat reservoirs includes a liquid hydrogen bath and said other spaced heat reservoir includes a liquid helium bath.

3. A magneto-caloric cryogenic refrigerator comprising: a pair of spaced, thermally isolated heat reservoirs, a material having superconducting properties coupling said reservoirs with said material being the sole thermal connecting means therebetween, means for placing said material in a superconductive state and means for subjecting adjacent portions of said material sequentially, in a progressive manner, from one reservoir to the other, to a magnetic field of critical field intensity to cause said subjected portion to momentarily revert to its normal state with a resultant reduction in temperature whereby a heat transfer from one of said reservoirs to said other reservoir is achieved.

4. Apparatus as claimed in claim 3 wherein one of said spaced heat reservoirs includes a bath formed of solid nitrogen at low pressure, and the other of said spaced heat reservoirs includes a bath of liquid helium at atmospheric pressure.

5. Apparatus as claimed in claim 3 wherein said magnetic field subjecting means comprises a permanent magnet having spaced poles of opposite polarity forming an air gap therebetween, and said apparatus further includes means for positioning said poles on opposite sides of said superconductive material such that the material therebetween is positioned in the path of the magnetic field between said poles and means for moving said permanent magnet along said material between said pair of spaced heat reservoirs.

6. Apparatus as claimed in claim 3 wherein said magnetic field subjecting means comprises a superconducting solenoid surrounding said material and movable longitudinally thereof, and said apparatus further includes means to energize said solenoid and means to move said solenoid from one reservoir to the other.

7. A magneto-caloric cryogenic refrigerator comprising: a high temperature reservoir, a low temperature reservoir thermally isolated and spaced from said high temperature reservoir, a longitudinal rod of material having superconducting properties positioned between said reservoirs and acting as the sole thermal connecting means therebetween, means for placing said rod in the superconductive state, a permanent magnet having spaced poles of opposite polarity forming a permanent magnet field between said poles, means for positioning said permanent magnet on said rod with said rod in the path of said magnetic field and means for moving said permanent magnet along said longitudinal rod whereby portions of said longitudinal rod are sequentially and progressively subjected to said magnetic field of critical field intensity to cause said subjected portion to momentarily revert to its normal state with a resultant decrease in temperature whereby a net heat transfer to said reservoir in the direction of movement of said permanent magnet is achieved.

8. A magneto-caloric cryogenic refrigerator comprising: a high temperature reservoir, a low temperature reservoir thermally isolated from said high temperature reservoir, a longitudinal rod of material having superconducting properties positioned between said reservoirs and acting as the sole thermal connecting means therebetween means for placing said rod in the superconductive state, means for subjecting adjacent portions of said longitudinal rod sequentially and progressively from one reservoir to the other to a magnetic field of critical field intensity to cause said subjected portion to momentarily revert to its normal state with a resultant decrease in temperature whereby a net heat transfer from one of said reservoirs to said other reservoir is achieved.

9. A magneto-caloric cryogenic refrigerator comprising: a pair of spaced, thermally isolated heat reservoirs, a material having superconducting properties positioned between said heat reservoirs and acting as the sole thermal connecting means therebetween, means for placing said material in the superconductive state, an electrical coil surrounding at least a portion of said material, means for momentarily energizing adjacent portions of said electrical coil in a sequential manner to provide a local magnetic field of critical field intensity to cause a localized portion of said material to momentarily revert to its normal state with a resultant reduction in temperature whereby a net heat transfer from one of said reservoirs to said other reservoir is achieved.

10. Apparatus as claimed in claim 9 wherein said electrical coil is formed of superconducting material.

11. A magneto-caloric cryogenic refrigerator comprising: a pair of spaced, thermally isolated heat reservoirs, a longitudinal rod of material having superconducting properties coupling said reservoirs and being the sole thermal connecting means therebetween, means for placing said rod in the superconductive state, an electrical coil surrounding said rod and extending from one reservoir to the other, said electrical coil having a plurality of spaced taps, means for sequentially energizing pairs of taps in a progressive manner to momentarily produce a magnetic field of critical field intensity at a localized area along said rod to cause said subjected portion of said rod to momentarily revert to its normal state with a resultant reduction in temperature whereby a net heat transfer from one of said reservoirs to the other reservoir is achieved.

12. Apparatus as claimed in claim 11 wherein said coil has a minimum pitch to reduce fringe flux outside the area of the momentarily energized pair of taps.

13. Apparatus as claimed in claim 11 wherein said electrical coil is formed of superconducting material.

14. A magneto-caloric cryogenic refrigerator comprising: a material exhibiting superconducting properties, a first relatively high temperature reservoir, means for maintaining said first reservoir at a temperature sufficiently low to produce superconductivity therein, a second relatively low temperature reservoir, means for moving said material in sequence through four positions including a first position in thermal contact with said first reservoir, a second position out of contact with either reservoir, a third position in thermal contact with said second reservoir, and a fourth position out of contact with either of said reservoirs, and means for subjecting said moving material to a magnetic field of critical field intensity in said second and third positions to effect a transition of said material from its superconductive to its normal state, whereby said material acts in said second position to change from the superconductive to the normal state with a resultant reduction in temperature to a value less than the temperature of either reservoir, said material acts in said third position to effect a heat transfer from the low temperature reservoir to said material and said material acts in said fourth position to change from the normal state to a state of superconductivity with an increase in temperature to a value higher than the temperature of either reservoir, whereupon said material in returning to said first position acts to transfer heat from said material to said first relatively high temperature reservoir.

15. Apparatus as claim in claim 14 wherein said relatively high temperature reservoir includes a bath formed of one material of a group including solid nitrogen at low pressure and liquid hydrogen at atmospheric pressure and said second relatively low temperature reservoir includes a liquid helium bath at atmospheric pressure.

16. A magneto-caloric cryogenic refrigerator comprising: a first relatively high temperature reservoir, a second relatively low temperature reservoir, a rotary member including a portion formed of material exhibiting superconductive properties, means for maintaining said first reservoir at a temperature sufficiently low to produce superconductivity in said material and means for effecting rotary movement of said material in sequence through four positions including a first position in thermal contact with said first reservoir, a second position out of contact with either reservoir, a third position in thermal contact with said second reservoir and a fourth position out of contact with either of said reservoirs, and means for subjecting said rotating material to a magnetic field of critical field intensity in said second and third positions to effect a transition of said material from the superconductive to the normal state, whereby said material acts in said second position to change from the superconductive to the normal state with a reduction in temperature to a value less than the temperature of either reservoir, said rotating material acts in the third position to effect a heat transfer from the low temperature reservoir to said material and acts in said fourth position to change from the normal state to a state of superconductivity with an increase in temperature to a value higher than the temperature of either reservoir whereupon said rotating material, in returning to said first position, acts to transfer heat from said material to said first relatively high temperature reservoir.

17. Magneto-caloric cryogenic refrigerator apparatus comprising: a first relatively high temperature reservoir, a second relatively low temperature reservoir, a wheel mounted for rotation between said first and second reservoirs and including at least a peripheral surface formed of a material exhibiting superconductive properties, means for maintaining said apparatus at a temperature sufficiently low to produce superconductivity in said material, means for rotating said wheel to effect movement of said material in sequence through four positions including a first position in thermal contact with said first reservoir, a second position out of contact with either reservoir, a third position in thermal contact with said second reservoir, and a fourth position out of contact with either of said reservoirs, and means for subjecting said moving material to a magnetic field of critical field intensity in said second and third positions to effect a transition of said material from the superconductive to the normal state whereby a portion of said peripheral surface when in said second position changes from the superconductive to the normal state with a resultant reduction in temperature to a value less than the temperature of either reservoir, said portion acts further in the third position to effect a heat transfer from the low temperature reservoir to said portion and acts in said fourth position to change from the normal state to a state of superconductivity with an increase in temperature to a value higher than the temperature of either reservoir whereupon said portion acts, in returning to said first position, to transfer heat from said material to said first relatively high temperature reservoir.

18. Cascaded, magneto-caloric cryogenic refrigerator apparatus comprising: at least three spaced heat reservoirs, members including portions formed of a material exhibiting superconductive properties positioned respectively between said first and second heat reservoirs and said second and third heat reservoirs and in thermal contact therewith, means for maintaining said apparatus at a sufficiently low temperature to produce superconductivity in said material, means for moving said members to effect a sequential movement of said material on each of said members through four positions including a first position in thermal contact with one of said respective reservoirs, a second position out of contact with either of said respective reservoirs, a third position in thermal contact with said other respective reservoir and a fourth position out of contact with either of said respective reservoirs, means for subjecting said moving material associated with each of said members through a magnetic field of critical field strength in said second and third positions to effect a transition of said material from the superconductive to a normal state, whereby said material acts in said second position to change from the superconductive to the normal state with a reduction in temperature to a value of less than the temperature of either of the respective reservoirs, said material acts in the third position to effect a heat transfer from said other respective reservoir to said material and acts in said fourth position to change from the normal state to a state of superconductivity with an increase in temperature to a value higher than the temperature of either of the respective reservoirs whereupon said material, in returning to said first position, acts to transfer heat from said material to said one respective reservoir to provide a net heat transfer from said third reservoir to said first reservoir.

References Cited in the file of this patent

UNITED STATES PATENTS

| | | |
|---|---|---|
| 2,913,881 | Garwin | Nov. 24, 1959 |
| 3,004,394 | Fulton | Oct. 17, 1961 |

OTHER REFERENCES

"A Magnetic Refrigerator Employing Superconducting Solenoids," by J. E. Zimmerman, J. D. McNutt and H. V. Bohm, in the publication Cryogenics, March 1962, volume 2, number 3, pages 153 to 159.